US012799358B2

(12) United States Patent
Fujiwara et al.

(10) Patent No.: US 12,799,358 B2
(45) Date of Patent: Nov. 17, 2026

(54) ROOM-TEMPERATURE-CURABLE SILICONE COATING COMPOSITION AND ARTICLE

(71) Applicant: SHIN-ETSU CHEMICAL CO., LTD., Tokyo (JP)

(72) Inventors: Akitsugu Fujiwara, Annaka (JP); Takafumi Sakamoto, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 515 days.

(21) Appl. No.: 18/287,680

(22) PCT Filed: Apr. 13, 2022

(86) PCT No.: PCT/JP2022/017673

§ 371 (c)(1),
(2) Date: Oct. 20, 2023

(87) PCT Pub. No.: WO2022/224885

PCT Pub. Date: Oct. 27, 2022

(65) Prior Publication Data

US 2024/0199912 A1 Jun. 20, 2024

(30) Foreign Application Priority Data

Apr. 22, 2021 (JP) ................................ 2021-072231

(51) Int. Cl.

| | |
|---|---|
| *C09D 7/63* | (2018.01) |
| *C08G 77/38* | (2006.01) |
| *C08K 5/5415* | (2006.01) |
| *C08L 83/04* | (2006.01) |
| *C09D 183/04* | (2006.01) |

(52) U.S. Cl.

CPC ........... *C09D 183/04* (2013.01); *C08G 77/38* (2013.01); *C08K 5/5415* (2013.01); *C08L 83/04* (2013.01); *C09D 7/63* (2018.01); *C08L 2201/08* (2013.01); *C08L 2201/10* (2013.01); *C08L 2203/202* (2013.01); *C08L 2205/02* (2013.01)

(58) Field of Classification Search

CPC .......... C09D 183/04; C09D 7/63; C09D 7/65; C09D 183/06; C08G 77/38; C08G 77/70; C08G 77/04; C08G 77/16; C08K 5/5415; C08K 5/56; C08L 83/06; C08L 83/04; C08L 2201/08; C08L 2201/10; C08L 2203/202; C08L 2205/02

USPC ......................................................... 524/588

See application file for complete search history.

(56) References Cited

U.S. PATENT DOCUMENTS

| | | | |
|---|---|---|---|
| 4,546,018 | A | 10/1985 | Ryuzo et al. |
| 2002/0010273 | A1 | 1/2002 | Matsumura et al. |
| 2004/0082736 | A1 | 4/2004 | Sakamoto et al. |

FOREIGN PATENT DOCUMENTS

| | | | |
|---|---|---|---|
| EP | 1 932 887 | A1 | 6/2008 |
| JP | 58-52350 | A | 3/1983 |
| JP | 2001-348528 | A | 12/2001 |
| JP | 2002-327115 | A | 11/2002 |
| JP | 2004-143331 | A | 5/2004 |
| JP | 2007-99955 | A | 4/2007 |
| JP | 2008-144042 | A | 6/2008 |
| JP | 2012-46694 | A | 3/2012 |
| JP | 2016-204612 | A | 12/2016 |
| JP | 6319168 | B2 | 5/2018 |
| JP | 2019-73670 | A | 5/2019 |
| JP | 2020-7505 | A | 1/2020 |

OTHER PUBLICATIONS

English Translation of JP 2016-204612 (Year: 2016).*
English Translation of JP 2008-144042 (Year: 2008).*
International Search Report (PCT/ISA/210) issued in PCT/JP2022/017673, dated Jul. 12, 2022.

* cited by examiner

*Primary Examiner* — Hannah J Pak
(74) *Attorney, Agent, or Firm* — Birch, Stewart, Kolasch & Birch, LLP

(57) ABSTRACT

A room-temperature-curable silicone coating composition comprising (A) an organopolysiloxane resin of a three-dimensional net structure which has an $R_3SiO_{1/2}/SiO_{4/2}$ molar ratio of 0.5-1.5, contains a given amount of silanol groups, and has a molecular weight of 2,000-10,000,
(B) a silane compound having three or more hydrolyzable groups in the molecule and/or a product of partial hydrolytic condensation of the silane compound,
(C) a linear diorganopolysiloxane in which both ends of the molecular chain have been blocked with silanol groups, and
(D) a moisture-curing initiator comprising an oligomer of an organotitanium compound, the room-temperature-curable silicone coating composition giving a cured object having a durometer A hardness of 50 or greater.

This composition can be an alcohol elimination type room-temperature-curable silicone coating composition which can be easily produced at low cost, has excellent long-term storage stability, and gives high-hardness cured objects (coating films), the cured coating films combining transparency with heat resistance.

6 Claims, No Drawings

ROOM-TEMPERATURE-CURABLE SILICONE COATING COMPOSITION AND ARTICLE

TECHNICAL FIELD

The present invention relates to a room-temperature-vulcanizing silicone coating composition that provides a cured product/coating film having high hardness with a hardness (Duro A hardness) of 50 or more as measured by Durometer Type A specified in JIS K 6249, and particularly relates to a room-temperature-vulcanizing silicone coating composition containing an organopolysiloxane resin of three-dimensional network structure suitable for coating agents (conformal coating agents) for electrical or electronic parts and substrates thereof, sealing agents for liquid crystal display elements, and the like.

In particular, the present invention relates to a room-temperature-vulcanizing silicone coating composition of dealcoholization type which is characterized by being simple in production, being low in cost, being capable of forming a coating film having high hardness, and having a cured coating film being highly transparent and excellent in heat resistance.

BACKGROUND ART

A room-temperature-vulcanizing (RTV) silicone rubber composition which can be crosslinked and cured at room temperature (23 °C±15 °C) by airborne moisture to give a silicone elastomer (silicone rubber cured product) is easy to handle and excellent in weather resistance and electrical characteristics, and thus is used in various fields such as sealing materials for building materials and adhesive agents in the electric and electronic fields. Particularly in the electric/electronic field, there is a tendency that RTV silicone rubber compositions of dealcoholization type are used because they are adequate for bonding and coating to (typically resinous) adherends used therein. In addition, the same applies to coating agents for liquid crystal peripheries and power supply circuit boards, for which demand has rapidly increased in recent years, and RTV silicone rubber compositions of dealcoholization type are used. However, although this coating agent satisfies performance such as insulation and moisture-proof of electrical and electronic circuits, which are main purposes of the coating agent, the improvement in hardness as a conformal coating agent for the purpose of protecting wiring and the like associated with the miniaturization of circuit patterns is insufficient. The following techniques have been disclosed for silicone rubber for the purpose of protecting circuit patterns and moisture-proof.

JP-A 2004-143331 (Patent Document 1) discloses a room-temperature-vulcanizing organopolysiloxane composition that provides a cured product/coating film having high transparency and high strength. An organopolysiloxane consisting of $(CH_3)_3SiO_{1/2}$ units and $SiO_{4/2}$ units in a molar ratio of $(CH_3)_3SiO_{1/2}$ units to $SiO_{4/2}$ units of 0.74 and having a silicon-bonded hydroxy content of 1.62 wt % and both end silanol-capped dimethylpolysiloxane are subjected to condensation reaction at 20 °C for 12 hours with the aid of aqueous ammonia. Such a long reaction time is a problem. In addition, even when the ammonia removal step by heating is added, the odor of ammonia remains in the composition, which may cause a problem in practical use.

JP-A 2002-327115 (Patent Document 2) discloses a room-temperature-vulcanizing organopolysiloxane composition excellent in moisture-proof properties. The RTV organopolysiloxane composition is prepared by dissolving an organopolysiloxane consisting of $(CH_3)_3SiO_{1/2}$ units and $SiO_{4/2}$ units in a molar ratio of $(CH_3)_3SiO_{1/2}$ units to $SiO_{4/2}$ units of 0.74 and having silanol groups at both ends of the molecular chain in toluene to form a resinous copolymer, and adjusting heating conditions. Due to the heating step, there is a problem that the production is not simple.

JP-A 2007-99955 (Patent Document 3) also discloses a method for producing a room-temperature-vulcanizing organopolysiloxane composition that gives a cured product and a coating film having high strength. An organopolysiloxane composed of a $(CH_3)_3SiO_{1/2}$ unit and a $SiO_{4/2}$ unit and having $(CH_3)_3SiO_{1/2}$ unit/$SiO_{4/2}$ unit (molar ratio)=0.75 and a hydroxy group content bonded to a silicon atom of 1.1 wt % and a dimethylpolysiloxane capped at both ends of the molecular with silanol groups are subjected to a condensation reaction with tetramethylguanidine at room temperature for 1 hour. Although the production time is shortened as compared with JP-A 2002-327115 (Patent Document 2), since an amine compound having high polarity is used, compatibility with the organosiloxane composition is poor, and the amine compound is not directly crosslinked with the organopolysiloxane, so that there is a problem that the amine compound oozes out from the composition.

Japanese Patent No. 6319168 (Patent Document 4) discloses a method for producing a room-temperature-vulcanizing organosiloxane composition characterized by simple production and short tact time, and discloses a method for producing a condensation reaction product (silicone rubber cured product) by performing a condensation reaction of an organopolysiloxane resin of three-dimensional network structure composed of an $R_3SiO_{1/2}$ unit and a $SiO_{4/2}$ unit with an organosilane compound having two or more hydrolyzable groups bonded to a silicon atom in one molecule on average using an amino group-containing organosilane as a catalyst to introduce a hydrolyzable group into the organopolysiloxane resin of three-dimensional network structure in advance, and then performing a condensation reaction of the organopolysiloxane resin with a linear diorganopolysiloxane capped at both ends of the molecular chain with a silanol group in the presence of a catalyst, when the composition is a dealcoholization type, this composition contains, as a condensation catalyst, alkoxytitanium (simple substance) which is easily hydrolyzed by moisture in the air, and thus the composition itself may be whitened. In addition, a composition formulated with a condensation catalyst such as general alkoxytitanium (simple substance) has problems such as occurrence of yellowing during long-term storage. In addition, JP 6319168 (Patent Document 4) discloses a method for producing a deacetone-type room-temperature-vulcanizing composition in which vinyltriisopropenoxysilane as a crosslinking agent and tetramethylguanidylpropyltrimethoxysilane as a condensation catalyst are blended. These silanes are expensive. Since a condensation catalyst such as tetramethylguanidylpropyltrimethoxysilane exhibits strongly basic, the silanes react with a flux component used for an electrical or electronic part and a substrate thereof, and a conductive salt is produced, which may cause a decrease in electrical performance. Furthermore, these compositions have problems such as low transparency and low heat resistance of the obtained cured product.

PRIOR ART DOCUMENTS

Patent Documents

Patent Document 1: JP-A 2004-143331
Patent Document 2: JP-A 2002-327115

Patent Document 3: JP-A 2007-99955
Patent Document 4: JP 6319168

SUMMARY OF INVENTION

Technical Problem

The present invention has been made in view of the above circumstances, and an object of the present invention is to provide a room-temperature-vulcanizing silicone coating composition of dealcoholization type containing an organopolysiloxane resin of three-dimensional network structure resin, which is suited as a coating agent in the electric and electronic field (particularly, liquid crystal surrounding and a power supply circuit boards), which is simple to produce and low in cost, has excellent in long-term storage stability, and gives a cured product (coating film) with both transparency and heat resistance and having high hardness; and an article coated with the cured product of the composition.

Solution to Problem

As a result of intensive studies to achieve the above object, the present inventors have found that a room-temperature-vulcanizing silicone coating composition containing (A) an organopolysiloxane resin having a silanol group in a specific amount and of three-dimensional network structure with a specific molecular weight and a specific molecular structure as a main component, (B) a hydrolyzable (organo)silane compound having three or more hydrolyzable groups in one molecule and/or a partial hydrolytic condensate thereof as a crosslinking agent, (C) a linear diorganopolysiloxane which is capped at both ends of the molecular chain with a silanol group as a flexibility imparting agent, and (D) a moisture curing initiator composed of an oligomer of an organotitanium compound as a curing catalyst in a specific amount becomes to be a room-temperature-vulcanizing silicone coating composition that can be suitably applied as a conformal coating material in which the composition is simple to produce and low in cost, and further, the composition gives a cured product having a hardness of 50 or more as measured by Durometer Type A specified in JIS K 6249, and the cured coating film has both transparency and heat resistance, and is not discolored even when stored for a long period of time (excellent in long-term storage stability), and thus have completed the present invention.

That is, the present invention provides a room-temperature-vulcanizing silicone coating composition described below and an article coated with a cured product of the composition.

[1]

A room-temperature-vulcanizing silicone coating composition comprising components (A) to (D):

(A) 100 parts by weight of an organopolysiloxane resin of three-dimensional network structure comprising $R_3SiO_{1/2}$ units and $SiO_{4/2}$ units wherein R is independently an unsubstituted or substituted $C_1$-$C_6$ monovalent hydrocarbon group or hydroxy group, in a molar ratio of $R_3SiO_{1/2}$ units to $SiO_{4/2}$ units of from 0.5 to 1.5, optionally comprising $R_2SiO_{2/2}$ units and $RSiO_{3/2}$ units wherein R is as defined above in an each molar ratio of $R_2SiO_{2/2}$ units to $SiO_{4/2}$ units and $RSiO_{3/2}$ units to $SiO_{4/2}$ units independently of from 0 to 1, the resin containing 0.005 to 0.15 mol/100 g of silicon-bonded hydroxy groups or silanol groups, and having a molecular weight of 2,000 to 10,000, (B) a hydrolyzable (organo)silane compound having three or more hydrolyzable groups in one molecule and/or partial hydrolytic condensate thereof in such an amount as to give a molar ratio of component (B) to silanol groups in component (A) of from 0.2 to 2, (C) 10 to 100 parts by weight of a linear diorganopolysiloxane which is capped at both ends of the molecular chain with a silanol group, and (D) 0.1 to 5 parts by weight of a moisture curing initiator composed of an oligomer of an organotitanium compound, wherein the composition gives a cured product having a hardness of 50 or more as measured by Durometer Type A specified in JIS K 6249.

[2]

The room-temperature-vulcanizing silicone coating composition according to [1], wherein the component (D) is an oligomer of a titanate ester compound and/or an oligomer of a titanium chelate compound.

[3]

The room-temperature-vulcanizing silicone coating composition according to [1] or [2], wherein the composition gives a cured product that does not generate an air bubble after being left to stand for 5 minutes in an environment at 250 °C.

[4]

The room-temperature-vulcanizing silicone coating composition according to any one of [1] to [3], wherein the composition gives a cured product having a light transmittance of 70% or more at a wavelength region of 450 to 800 nm, as measured in the cured product of 1 mm thick.

[5]

The room-temperature-vulcanizing silicone coating composition according to any one of claims [1] to [4], which is used for coating electrical or electronic parts and/or substrates thereof.

[6]

An article coated with a cured product of the room-temperature-vulcanizing silicone coating composition according to any one of claims [1] to [5].

Advantageous Effects of Invention

According to the present invention, it is possible to provide a room-temperature-vulcanizing silicone coating composition which is simple to produce, low in cost, and excellent in long-term storage stability, provides a cured product (coating film) having high hardness of 50 or more as measured by Durometer Type A specified in JIS K 6249, and provides a cured film having both transparency and heat resistance.

DESCRIPTION OF EMBODIMENTS

Hereinafter, the present invention is described in detail.

The room-temperature-vulcanizing silicone coating composition of the present invention provides a cured product containing the following components (A) (main component), (B) (crosslinking agent), (C) (flexibility imparting agent), and (D) (curing catalyst), and having a hardness (Hereinafter, it may be referred to as Duro A hardness.) of 50 or more as measured by Durometer Type A defined in JIS K 6249.

Component (A)

First, in the room-temperature-vulcanizing silicone coating composition of the present invention, the component (A)

used as the main component (base polymer) is an organopolysiloxane resin of three-dimensional network structure comprising $R_3SiO_{1/2}$ units and $SiO_{4/2}$ units wherein R is independently an unsubstituted or substituted $C_1$-$C_6$ monovalent hydrocarbon group or hydroxy group, in a molar ratio of $R_3SiO_{1/2}$ units to $SiO_{4/2}$ units of from 0.5 to 1.5, optionally comprising $R_2SiO_{2/2}$ units and $RSiO_{3/2}$ units wherein R is as defined above in an each molar ratio of $R_2SiO_{2/2}$ units to $SiO_{4/2}$ units and $RSiO_{3/2}$ units to $SiO_{4/2}$ units independently of from 0 to 1, the resin containing 0.005 to 0.15 mol/100 g of silicon-bonded hydroxy groups or silanol groups, and having a molecular weight of 2,000 to 10,000.

R represents an unsubstituted or substituted $C_1$-$C_6$ monovalent hydrocarbon group or a hydroxy group, and examples of the monovalent hydrocarbon group of R include alkyl groups such as a methyl group, an ethyl group, a propyl group, an isopropyl group, a butyl group, an isobutyl group, a sec-butyl group, a tert-butyl group, a pentyl group, and a hexyl group, a cycloalkyl group such as a cyclohexyl group, and alkenyl groups such as a vinyl group and an allyl group; a phenyl group, and a chloromethyl group in which some or all of hydrogen atoms of these groups are substituted with halogen atoms and the like. As R, a methyl group, an ethyl group, a propyl group, and a phenyl group are preferable, and a methyl group and a phenyl group are particularly preferable.

In the component (A), the molar ratio of the $R_3SiO_{1/2}$ units to the $SiO_{4/2}$ units is in the range of from 0.5 to 1.5, preferably from 0.6 to 1.3, particularly preferably from 0.65 to 1.2. When the molar ratio is less than 0.5, the reinforcing property of the cured product becomes insufficient, and when the molar ratio exceeds 1.5, the hardness of the cured product becomes insufficient.

The organopolysiloxane resin of the component (A) of three-dimensional network structure is preferably composed of only $R_3SiO_{1/2}$ units and $SiO_{4/2}$ units, but both the molar ratio of the $R_2SiO_{2/2}$ units to the $SiO_{4/2}$ units and the molar ratio of the $RSiO_{3/2}$ units to the $SiO_{4/2}$ units may contain each unit in the range of from 0 to 1, and more desirably, the molar ratio is from 0.8 or less (from 0) to 0.8), respectively.

In addition, it is necessary that the silanol group contained in the organopolysiloxane resin having the three-dimensional network structure of the component (A) is 0.005 to 0.15 mol/100 g (that is, 0.085 to 2.5 wt % in terms of OH amount of the hydroxy group bonded to the silicon atom), preferably 0.01 to 0.13 mol/100 g (0.17 to 2.2 wt %), and more preferably 0.02 to 0.12 mol/100 g (0.3 to 2.0 wt %). If the silanol group is present in an amount of more than 0.15 mol/100 g, the rubber properties (in particular, hardness) become high, and cracking of the composition may occur. If the amount of the silanol group is less than 0.005 mol/100 g, the condensation reaction between the component (A) and the component (C) may not sufficiently proceed, and the desired characteristics may not be obtained.

The organopolysiloxane resin of three-dimensional network structure of the component (A) has a molecular weight of about 2,000 to 10,000, preferably about 2,500 to 8,000, and when the molecular weight is too small, a cured product (silicone rubber cured product) obtained by curing the organopolysiloxane composition has poor rubber elasticity and is easily broken, and when the molecular weight is too large, it is difficult to prepare a uniform organopolysiloxane composition. This molecular weight (or polymerization degree) can be usually determined as a numerical average molecular weight (or number average polymerization degree) or the like in terms of polystyrene in gel permeation chromatography (GPC) analysis using toluene, tetrahydrofuran (THF) or the like as a developing solvent.

The organopolysiloxane resin of three-dimensional network structure of the component (A) is obtained by co-hydrolyzing and condensing a monofunctional triorganosilane having one hydrolyzable group with a tetrafunctional silane having four hydrolyzable groups or with a trifunctional silane having three hydrolyzable groups and/or a bifunctional silane having two hydrolyzable groups in an organic solvent, and is a material (copolymer) substantially not containing a volatile component, and is a known material.

As the organic solvent used in the co-hydrolysis reaction, it is necessary to dissolve the organopolysiloxane resin as the component (A), and typical organic solvents include aromatic solvents such as toluene and xylene, halogen-based solvents such as chloroform and dichloromethane, and hydrocarbon-based solvents such as cyclohexane, ethylcyclohexane, and isoparaffin.

Component (B)

The component (B) is a hydrolyzable (organo)silane compound having three or more hydrolyzable groups in one molecule and/or a partial hydrolytic condensate thereof (a siloxane oligomer having three or more remaining hydrolyzable groups in a molecule produced by partially hydrolyzing and condensing the silane compound), which functions as a crosslinking agent (curing agent) for crosslinking the component (A) and the component (C) described later, and examples of the (organo)silane compound preferably include monosilane type compounds having the following general formulas (1) to (6), disilane type compounds in which monosilanes are linked by an alkylene group or an alkenylene group, and trisilane type compounds.

$$R^1Si(OR^2)_3 \quad (1)$$

$$Si(OR^2)_4 \quad (2)$$

$$R^1(OR^2)_2Si—X—Si(OR^2)_2R^1 \quad (3)$$

$$(OR^2)_3Si—X—Si(OR^2)_3 \quad (4)$$

$$R^1(OR^2)_2Si—X—SiR^1_2—X—Si(OR^2)_2R^1 \quad (5)$$

$$(OR^2)_3Si—X—SiR^1_2—X—Si(OR^2)_3 \quad (6)$$

In the above formula, $R^1$ represents an alkyl group such as a methyl group, an ethyl group, a propyl group, an isopropyl group, a butyl group, an isobutyl group, a sec-butyl group, a tert-butyl group, a hexyl group, or a decyl group; an alkenyl group such as a vinyl group (ethenyl), an allyl group, a propenyl group, an isopropenyl group, a butenyl group, a pentenyl group, or a hexenyl group; an aryl group such as a phenyl group, a tolyl group, a xylyl group, or an α-, β-naphthyl group; an aralkyl group such as a benzyl group, a 2-phenylethyl group, or a 3-phenylpropyl group; and some or all of hydrogen atoms of these groups represent a group substituted with a halogen atom such as F, Cl, or Br, a cyano group, or the like, for example, an unsubstituted or substituted $C_1$-$C_{10}$ monovalent hydrocarbon group, such as a 3-chloropropyl group, a 3,3,3-trifluoropropyl group, or a 2-cyanoethyl group. Among these groups, an aliphatic unsaturated hydrocarbon group such as an alkenyl group is preferably excluded, an alkyl group such as a methyl group or an ethyl group is more preferable, and a methyl group is particularly preferable.

Examples of the hydrolyzable group ($OR^2$) include $C_1$-$C_4$, particularly $C_1$ or $C_2$ alkoxy groups such as a methoxy group, an ethoxy group, a propoxy group, an isopropoxy group, a butoxy group, an isobutoxy group, and a tert-butoxy group; $C_2$-$C_4$ alkoxyalkoxy groups such as a methoxyethoxy group, an ethoxyethoxy group, and a methoxypropoxy group; $C_3$-$C_7$ ketoxime groups such as a dimethylketoxime group, an ethylmethylketoxime group, and a diethylketoxime group; $C_2$-$C_6$ alkenyloxy groups such as a vinyloxy group, a propenyloxy group, an isopropenyloxy group, and a 1-ethyl-2-methylvinyloxy group; a $C_2$-$C_8$ acyloxy groups such as an acetoxy group, an octanoyloxy group, and a benzoyloxy group; and $C_2$-$C_6$ dialkylaminoxy groups such as a dimethylaminoxy group and a diethylaminoxy group, and an alkoxy group and an isopropenoxy group are preferable, and an alkoxy group is particularly preferable.

X represents a $C_2$-$C_6$ alkylene group, such as an ethylene group, a propylene group (trimethylene group, methylethylene group), a butylene group (tetramethylene group, methylpropylene group), or a hexamethylene group; and a $C_2$-$C_4$ alkenylene group, such as a vinylene group, a propenylene group, a 1-butenylene group, or a 2-butenylene group.

Specific examples of the component (B) include trialkoxysilanes such as methyltrimethoxysilane, methyltriethoxysilane, vinyltrimethoxysilane, vinyltriethoxysilane, phenyltrimethoxysilane, phenyltriethoxysilane, ethyltrimethoxysilane, ethyltriethoxysilane, n-propyltrimethoxysilane, n-propyltriethoxysilane, n-butyltrimethoxysilane, n-butyltriethoxysilane, isobutyltrimethoxysilane, n-hexyltrimethoxysilane, and n-decyltrimethoxysilane; tetraalkoxysilanes such as tetramethoxysilane, tetraethoxysilane, bis[2-(dimethoxy(methyl)silyl)ethenyl]dimethylsilane, and bis[2-(diethoxy(methyl)silyl)ethenyl]dimethylsilane; hexaalkoxysilanes such as 1,2-bis(trimethoxysilyl)ethane, 1,2-bis(triethoxysilyl)ethane, 1,6-bis(trimethoxysilyl)hexane, 1,6-bis(triethoxysilyl)hexane, bis[2-(trimethoxysilyl)ethenyl]dimethylsilane, and bis[2-(triethoxysilyl)ethenyl]dimethylsilane; isopropenoxy group-containing silanes such as methyltriisopropenoxysilane, ethyltriisopropenoxysilane, vinyltriisopropenoxysilane, and phenyltriisopropenoxysilane; acetoxysilane such as methyltriacetoxysilane, ethyltriacetoxysilane, and vinyltriacetoxysilane, and a partial hydrolytie condensate thereof.

Examples of the hydrolyzable (organo)silane compound as the component (B) include a hydrolyzable organosilane compound having the following general formula (7) and having a methylene group (for example, an organooxymethyl group such as an alkoxymethyl group) having an organooxy group (for example, an alkoxy group or the like) having $R^4O$— at the α-position as a substituent bonded to a silicon atom.

[Chem. 1]

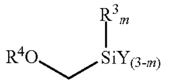

(7)

(In the formula, $R^3$ is independently an unsubstituted or substituted $C_1$-$C_{12}$ monovalent hydrocarbon group, preferably $C_1$-$C_8$, more preferably $C_1$-$C_4$, $R^4$ is an unsubstituted or substituted $C_1$-$C_{12}$ monovalent hydrocarbon group, preferably $C_1$-$C_8$, more preferably $C_1$-$C_4$, Y is a hydrolyzable group, and m is 0 or 1.)

In the above formula (7), examples of the unsubstituted or substituted $C_1$-$C_{12}$ monovalent hydrocarbon group, preferably $C_1$-$C_8$, and more preferably $C_1$-$C_4$ having $R^3$ include alkyl groups such as a methyl group, an ethyl group, a propyl group, an isopropyl group, a butyl group, an isobutyl group, a sec-butyl group, a tert-butyl group, a pentyl group, a hexyl group, a heptyl group, an octyl group, a 2-ethylhexyl group, a nonyl group, a decyl group, and a dodecyl group; cycloalkyl groups such as a cyclopentyl group and cyclohexyl group; alkenyl groups such as a vinyl group, an allyl group, a propenyl group, an isopropenyl group, a butenyl group, a pentenyl group, and a hexenyl group; aryl groups such as a phenyl group, a tolyl group, a xylyl group, and an α-, β-naphthyl group; aralkyl groups such as a benzyl group, a 2-phenylethyl group, and a 3-phenylpropyl group; and groups in which some or all of hydrogen atoms of these groups are substituted with a halogen atom such as F, Cl, or Br, a cyano group, and the like, for example, a 3-chloropropyl group, a 3,3,3-trifluoropropyl group, a 2-cyanoethyl group, and the like. Among them, an aliphatic unsaturated hydrocarbon group such as an alkenyl group is preferably excluded, an alkyl group such as a methyl group or an ethyl group is more preferable, and a methyl group is particularly preferable.

Next, in the above formula (7), examples of the unsubstituted or substituted $C_1$-$C_{12}$ monovalent hydrocarbon group, preferably $C_1$-$C_8$, and more preferably $C_1$-$C_4$ having $R^4$ include alkyl groups such as a methyl group, an ethyl group, a propyl group, an isopropyl group, a butyl group, an isobutyl group, a sec-butyl group, a tert-butyl group, a pentyl group, a hexyl group, a heptyl group, an octyl group, a 2-ethylhexyl group, a nonyl group, a decyl group, and a dodecyl group; cycloalkyl groups such as a cyclopentyl group and cyclohexyl group; alkenyl groups such as a vinyl group, an allyl group, a propenyl group, an isopropenyl group, a butenyl group, a pentenyl group, and a hexenyl group; aryl groups such as a phenyl group, a tolyl group, a xylyl group, and an α-, β-naphthyl group; aralkyl groups such as a benzyl group, a 2-phenylethyl group, and a 3-phenylpropyl group; and groups in which some or all of hydrogen atoms of these groups are substituted with a halogen atom such as F, Cl, or Br, a cyano group, and the like, for example, a 3-chloropropyl group, a 3,3,3-trifluoropropyl group, a 2-cyanoethyl group, and the like, and alkyl groups in which some of hydrogen atoms of these groups are substituted with a lower alkoxy group such as a methoxy group or an ethoxy group, for example, a methoxymethyl group, a methoxyethyl group, an ethoxymethyl group, an ethoxyethyl group, and the like. Among them, a $C_1$-$C_4$ lower alkyl group such as a methyl group or an ethyl group is preferable.

In the above formula (7), Y represents a hydrolyzable group, examples of Y include $C_1$-$C_4$ alkoxy groups such as a methoxy group, an ethoxy group, a propoxy group, an isopropoxy group, a butoxy group, an isobutoxy group, and a tert-butoxy group; $C_2$-$C_4$ alkoxyalkoxy groups such as a methoxyethoxy group, an ethoxyethoxy group, and a methoxypropoxy group; $C_2$-$C_8$ acyloxy groups such as an acetoxy group, an octanoyloxy group, and a benzoyloxy group; $C_2$-$C_6$ alkenyloxy groups such as a vinyloxy group, a propenyloxy group, an isopropenyloxy group, and a 1-ethyl-2-methylvinyloxy group; $C_3$-$C_7$ ketoxime groups such as a dimethylketoxime group, a methylethylketoxime group, and a diethylketoxime group; $C_2$-$C_6$ amino groups such as a dimethylamino group, a diethylamino group, a butylamino group, and a cyclohexylamino group; $C_2$-$C_6$ aminoxy groups such as a dimethylaminoxy group and a diethylaminoxy group; and $C_3$-$C_8$ amide groups such as an N-methylacetamide group, an N-ethylacetamide group, and an N-methylbenzamide group. Among them, an alkoxy group is preferable, and a methoxy group and an ethoxy group are particularly preferable.

In the formula, m is 0 or 1, preferably 0.

Specific examples of the hydrolyzable organosilane compound having the formula (7) and containing an organooxymethyl group such as an alkoxymethyl group bonded to a silicon atom in the molecule, and a partial hydrolytic condensate thereof include methoxymethyltrimethoxysilane, ethoxymethyltriethoxysilane, methoxymethyl(methyl)dimethoxysilane, ethoxymethyl(methyl)diethoxysilane, methoxymethyl(ethyl)dimethoxysilane, ethoxymethyl(ethyl)diethoxysilane, methoxymethyl(hexyl)dimethoxysilane, ethoxymethyl(hexyl)diethoxysilane, methoxymethyl(octyl)dimethoxysilane, ethoxymethyl(octyl)diethoxysilane, methoxymethyl(phenyl)dimethoxysilane, ethoxymethyl(phenyl)diethoxysilane, and partial hydrolytic condensates thereof.

For example, the structural formulas of methoxymethyltrimethoxysilane and ethoxymethyltriethoxysilane in the above specific examples are as follows. Among them, ethoxymethyltriethoxysilane is particularly preferable.

[Chem. 2]

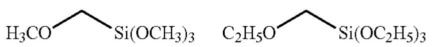

In the room-temperature-vulcanizing silicone coating composition of the present invention, the hydrolyzable (organo)silane compound having three or more hydrolyzable groups in one molecule of the component (B) and/or a partial hydrolytic condensate thereof act as a crosslinking agent (curing agent) that binds the component (A) to the component (C) described later, and the compounding amount of the component (B) is an amount such that the molar ratio of the component (B) to silanol groups in the component (A) is 0.2 to 2, and an amount such that the molar ratio is from 0.4 to 2 is particularly preferable. If the amount of the component (B) is too small, sufficient rubber properties may not be obtained or storage stability may be deteriorated even when the composition is cured, and if the amount is too large, rapid curability is impaired or it is economically disadvantageous.

In addition, the compounding amount of the component (B) is preferably an amount in which the molar ratio of the component (B) to the sum of the silanol group amounts in the component (A) and the component (C) is 0.3 to 1, and more preferably an amount in which the molar ratio is from 0.4 to 1.0. If the molar ratio of the component (B) to the sum of the amounts of the silanol groups in the component (A) and the component (C) is less than 0.3, good storage stability cannot be obtained, and when the molar ratio exceeds 1, it is disadvantageous in terms of cost in addition to prolonging the curing time.

The hydrolyzable (organo)silane compound as the component (B) is clearly distinguished from the silane coupling agent as an optional component described later in that the hydrolyzable (organo)silane compound does not have a monovalent hydrocarbon group substituted with a functional group having a heteroatom such as nitrogen, oxygen, or sulfur (Provided that organooxy groups are excluded.) in the molecule.

Component (C)

The component (C) is a component necessary for connecting the organopolysiloxane resins of three-dimensional network structure to each other by mixing with the component (A) and the component (B) and performing a condensation reaction with these components. The addition of the component (C) makes it possible to impart flexibility to the cured product (cured film) of the room-temperature-vulcanizing silicone coating composition of the present invention. Specifically, the component (C) is a linear diorganopolysiloxane which is capped at both ends of the molecular chain with a silanol group (or hydroxydiorganosiloxy groups), and is preferably one having the following general formula (8).

[Chem. 3]

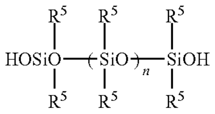

(8)

(In the formula, $R^5$ is independently an unsubstituted or alkoxy-substituted $C_1$-$C_{10}$ monovalent hydrocarbon group, and n is an integer of 10 or more.)

In the formula (8), examples of the unsubstituted or alkoxy-substituted $C_1$-$C_{10}$ monovalent hydrocarbon group of $R^5$ include alkyl groups such as a methyl group, an ethyl group, a propyl group, an isopropyl group, a butyl group, an isobutyl group, a sec-butyl group, a tert-butyl group, a pentyl group, and a hexyl group; cycloalkyl groups such as a cyclohexyl group and the like; alkenyl groups such as a vinyl group and allyl group; alkoxy-substituted monovalent hydrocarbon groups include aryl groups such as a phenyl group and a naphthyl group, and alkoxy-substituted monovalent hydrocarbon groups in which some or all of these hydrogen atoms are substituted with alkoxy groups (for example, substituted with alkoxy-substituted alkyl groups such as methoxymethyl group, methoxyethyl group, ethoxymethyl group, ethoxyethyl group, etc.). Among them, a methyl group is preferable.

The viscosity of the component (C) is preferably a fluid (liquid material) exhibiting a viscosity of 10,000 mPa·s or less (usually 30 to 10,000 mPa·s), preferably 50 to 8,000 mPa·s, particularly preferably about 100 to 6,000 mPa·s at 23 °C, and usually corresponds to the value of the number of repeating units n (polymerization degree) in the above formula (8) of about 10 to 1,000, preferably 30 to 500, more preferably about 50 to 400. The viscosity can be usually measured by a rotational viscometer (for example, BL type, BH type, BS type, cone plate type, and the like) (The same applies hereinafter.).

The compounding amount of the component (C) is 10 to 100 parts by weight, preferably 10 to 80 parts by weight, with respect to 100 parts by weight of the component (A). If the amount of the component (C) is too small, the composition cures but has too high hardness, so that good rubber properties cannot be obtained. If the amount is too large, there is a possibility that the component (C) and the component (A) are not uniformly mixed.

Component (D)

The component (D) is a moisture curing initiator including an oligomer of an organotitanium compound (a low polymerization degree polymerization (polycondensation) product of an organotitanium compound), and is a component that functions as a catalyst that accelerates moisture curing by moisture (water content) in the air at room temperature (23 °C±15 °C) of the room-temperature-vulcanizing silicone coating composition of the present invention, and as the oligomer of the organotitanium compound, one kind may be used alone as an oligomer of an organotitanium compound, or may be used as a mixture of two or more kinds thereof.

The component (D) is preferably an oligomer of a titanate ester compound and/or an oligomer of a titanium chelate compound.

Specific examples of the component (D) include oligomers of organotitanium compounds such as oligomers of titanate ester compounds such as oligomers of tetra-n-propoxytitanium, oligomers of tetraisopropoxytitanium, oligomers of tetra-n-butoxytitanium (also referred to as tetra-n-butyl titanate), oligomers of tetraisobutoxytitanium, oligomers of tetra-sec-butoxytitanium, oligomers of tetra-tert-butoxytitanium, oligomers of tetrakis(2-ethylhexoxy) titanium, and oligomers of titanium isopropoxyoctylene glycol, and oligomers of titanium chelate compounds such as oligomers of diisopropoxybis(acetylacetonate)titanium and oligomers of diisopropoxybis(ethylacetoacetonate)titanium. Among them, oligomers of titanic acid butyl ester compounds such as oligomers of tetra-n-butoxytitanium and oligomers of tetra-tert-butoxytitanium are particularly preferable from the viewpoint of environmental and human toxicity and the viewpoint of long-term color resistance of the room-temperature-vulcanizing silicone coating composition of the present invention. As the oligomer of the titanic acid butyl ester compound, for example, Tyzor BTP (manufactured by Dorf Ketal) or the like can be applied.

The oligomer of the organotitanium compound has a structure in which the titanate ester compound, or the titanium chelate compound is condensed, and is preferably a 2 to 50 mer and more preferably a 2 to 20 mer of these organotitanium compounds.

Such an oligomer of an organotitanium compound is obtained by condensing the organotitanium compound by reacting water in an alcohol solution.

The amount of the component (D) is 0.1 to 5 parts by weight, preferably 0.1 to 4 parts by weight, and particularly preferably 0.5 to 3 parts by weight with respect to 100 parts by weight of the component (A). When the amount is less than 0.1 parts by weight, sufficient crosslinkability cannot be obtained, and an intended cured product is not obtained. If the amount is more than 5 parts by weight, there are disadvantages such as a disadvantage in terms of price and a decrease in curing rate.

Other components

In the room-temperature-vulcanizing silicone coating composition of the present invention, in addition to the above components, a filler, various additives, and the like may be blended as necessary as long as the object of the present invention is not impaired. Examples of the filler include ground silica, fumed silica, calcium carbonate, zinc carbonate, aluminum hydroxide, aluminum hydroxide oxide, alumina, magnesium oxide, and wet silica. Examples of the additive include known additives such as a polyether as a wetter or a thixotropy improver, a plasticizer, and a non-reactive dimethyl silicone oil.

Furthermore, if necessary, a colorant such as a pigment or a dye, a fluorescent brightener, an antifungal agent, an antibacterial agent, a surface modifier such as a non-reactive phenyl silicone oil as a bleed oil, fluorosilicone oil, or an organic liquid incompatible with silicone may also be added.

A silane coupling agent (functional group-containing hydrolyzable organosilane compound having a monovalent hydrocarbon group substituted with a functional group having a hetero atom such as nitrogen, oxygen, or sulfur in the molecule, other than the component (B), so-called carbon functional silane compound) for imparting an adhesive property may also be blended. Examples of the component thereof include silane compounds having an alkoxysilyl group or an alkenoxysilyl group as a hydrolyzable group, and examples thereof include γ-methacryloxypropyltrimethoxysilane, β-(3,4-epoxycyclohexyl)ethyltrimethoxysilane, γ-glycidoxypropyltrimethoxysilane, γ-glycidoxypropylmethyldiethoxysilane, N-β-(aminoethyl)γ-aminopropyltrimethoxysilane, γ-aminopropyltriethoxysilane, 3-(N-aminomethylbenzylamino)propyltrimethoxysilane, N,N'-bis[3-(trimethoxysilyl)propyl] ethylenediamine, N,N-bis[3-(trimethoxysilyl)propyl] amine, γ-mercaptopropyltrimethoxysilane, γ-glycidoxypropyltriisopropenoxysilane, and γ-glycidoxypropylmethyldiisopropenoxysilane, a reaction product of (meth)acrylsilane and aminosilane, a reaction product of epoxysilane and aminosilane, and a reaction product of aminosilane and a halogenated alkyl group-containing silane. In particular, use of a silane coupling agent containing at least one amino group in the molecule is preferable.

When the silane coupling agent is blended, the compounding amount thereof is 0.1 to 20 parts by weight, preferably 0.1 to 10 parts by weight, and particularly preferably 0.1 to 5 parts by weight per 100 parts by weight of the component (A). When the amount is less than 0.1 parts by weight, a sufficient adhesive property cannot be obtained, and when the amount is more than 20 parts by weight, not only it is disadvantageous in terms of price but also good curability may not be exhibited.

The room-temperature-vulcanizing silicone coating composition of the present invention can be produced by mixing the above-described respective components according to a conventional method, and stored in an atmosphere avoiding moisture. The room-temperature-vulcanizing silicone coating composition is usually cured in the presence of moisture in the air in 5 minutes to 1 week by leaving to stand the composition at room temperature (23 °C±15 °C).

As the component (A), the organopolysiloxane resin of three-dimensional network structure is preferably blended as a solution having a solid content of 40 to 70 wt % using a predetermined organic solvent (for example, aromatic solvents such as toluene and xylene, halogen-based solvents such as chloroform and dichloromethane, and hydrocarbon-based solvents such as cyclohexane, ethylcyclohexane, and isoparaffin).

The viscosity of the room-temperature-vulcanizing silicone coating composition of the present invention is preferably 10 to 5,000 mPa·s, particularly preferably 20 to 3,000 mPa·s at 23 °C.

The room-temperature-vulcanizing silicone coating composition of the present invention is particularly characterized in that it is simple to produce and low in cost, a coating film having high hardness can be formed, and the cured coating film is highly transparent, excellent in heat resistance, and has no discoloring property over a long period of time.

The room-temperature-vulcanizing silicone coating composition of the present invention contains the components (A) to (D) defined as above and is characterized by providing a cured product having a hardness of 50 or more, preferably 50 to 90 as measured by Durometer Type A defined in JIS K 6249. When the Duro A hardness of the obtained cured product is less than 50, the cured product is unsuitable as a conformal coating agent for the purpose of protecting wiring and the like associated with the miniaturization of the circuit pattern. In addition, the room-temperature-vulcanizing silicone coating composition of the present invention can be made into a cured product having a Duro A hardness of 50 or more by condensation curing of the composition obtained by blending the above-described components (A) to (D) at the above-described specific blending ratio with moisture or the like in the air at room temperature according to a conventional method (for example, by an operation such as leaving to stand the composition to have a thickness of 3 mm for 7 days in an environment of 23 °C/50% RH).

In addition, the cured product of the room-temperature-vulcanizing silicone coating composition of the present invention is preferably one that does not generate air bubbles after being left to stand in an environment at 250 °C for 5 minutes, and it is preferable that the light transmittance is 70% or more at the wavelength region of 450 to 800 nm, as measured in the cured product of 1 mm thick. All of these cured products can be achieved by condensation curing of the composition obtained by blending the above-described components (A) to (D) at the above-described specific blending ratio with moisture or the like in the air at room temperature according to a conventional method (for example, by an operation such as leaving the composition to have a thickness of 3 mm for 7 days in an environment of 23 °C/50% RH).

The light transmittance in the specific wavelength region can be usually measured by a spectrophotometer.

Furthermore, the room-temperature-vulcanizing silicone coating composition of the present invention is preferably excellent in long-term storage stability in which the composition does not change its color even when stored at room temperature (23 °C±15 °C) for a long period of time (for example, about 4 months) in a sealed state with moisture blocked.

Such a room-temperature-vulcanizing silicone coating composition of the present invention is suitable as a conformal coating material, and is particularly suitable as a coating agent for electrical or electronic parts and/or substrates thereof, a sealing agent for liquid crystal display elements, and the like.

Further, according to the present invention, an article coated with a cured product of the room-temperature-vulcanizing silicone coating composition of the present invention can be provided.

Examples of the article to which the present invention is applied include a liquid crystal periphery, a power supply circuit board, and a water-repellent coated vehicle-mounted substrate.

EXAMPLES

Hereinafter, Examples and Comparative Examples specifically describing the present invention is described, but the present invention is not limited to the following Examples. In the following Examples, Me is a methyl group, the viscosity is a value measured by a rotational viscometer at 23 °C, and the molecular weight indicates a numerical average molecular weight in terms of polystyrene in GPC analysis using toluene as a developing solvent.

Example 1

Composition 1 was obtained by mixing 92 parts by weight of a three-dimensional network methylpolysiloxane resin consisting of $Me_3SiO_{1/2}$ units and $SiO_{4/2}$ units in a molar ratio of $Me_3SiO_{1/2}$ units to $SiO_{4/2}$ units of 0.68, having a molecular weight of about 3,500 and a silanol content of 0.11 mol/100 g (1.87 wt %), and dissolved in Isopar E (Exxon Mobil Corp., b.p. 115-140 °C, the same holds true, hereinafter) to a solid content of 60 wt % as component (A), 10 parts by weight (to give a molar ratio of component (B) to silanol groups in component (A) of 0.79) of tetraethoxysilane as component (B), 35 parts by weight of dimethylpolysiloxane capped at both ends of the molecular chain with hydroxydimethylsilyl groups and having a viscosity of 5,000 mPa·s at 23 °C and a degree of polymerization of about 389 as component (C), and 1 parts by weight of oligomer Tyzor BTP of tetra-n-butoxytitanium (manufactured by Dorf Ketal) as a component (D), and 1.6 parts by weight of γ-aminopropyltriethoxysilane at room temperature (23 °C) for 30 minutes.

Example 2

Composition 2 was obtained by mixing 92 parts by weight of a three-dimensional network methylpolysiloxane resin consisting of $Me_3SiO_{1/2}$ units and $SiO_{4/2}$ units in a molar ratio of $Me_3SiO_{1/2}$ units to $SiO_{4/2}$ units of 0.68, having a molecular weight of about 3,500 and a silanol content of 0.11 mol/100 g (1.87 wt %), and dissolved in Isopar E to a solid content of 60 wt % as component (A), 10 parts by weight (to give a molar ratio of component (B) to silanol groups in component (A) of 0.79) of tetraethoxysilane as component (B), 35 parts by weight of dimethylpolysiloxane capped at both ends of the molecular chain with hydroxydimethylsilyl groups and having a viscosity of 5,000 mPa·s at 23 °C and a degree of polymerization of about 389 as component (C), and 1 parts by weight of oligomer Tyzor BTP of tetra-n-butoxytitanium (manufactured by Dorf Ketal) as a component (D), and 0.8 parts by weight of γ-aminopropyltriethoxysilane at room temperature (23 °C) for 30 minutes.

Example 3

Composition 3 was obtained by mixing 92 parts by weight of a three-dimensional network methylpolysiloxane resin consisting of $Me_3SiO_{1/2}$ units and $SiO_{4/2}$ units in a molar ratio of $Me_3SiO_{1/2}$ units to $SiO_{4/2}$ units of 0.68, having a molecular weight of about 3,500 and a silanol content of 0.11 mol/100 g (1.87 wt %), and dissolved in Isopar E to a solid content of 60 wt % as component (A), 10 parts by weight (to give a molar ratio of component (B) to silanol groups in component (A) of 1.21) of methyltrimethoxysilane as component (B), 40 parts by weight of dimethylpolysiloxane capped at both ends of the molecular chain with hydroxydimethylsilyl groups and having a viscosity of 700 mPa·s at 23 °C and a degree of polymerization of about 270 as component (C), and 1 parts by weight of oligomer Tyzor BTP of tetra-n-butoxytitanium (manufactured by Dorf Ketal) as a component (D) at room temperature (23 °C) for 30 minutes.

Example 4

Composition 4 was obtained by mixing 92 parts by weight of a three-dimensional network methylpolysiloxane resin consisting of $Me_3SiO_{1/2}$ units and $SiO_{4/2}$ units in a molar ratio of $Me_3SiO_{1/2}$ units to $SiO_{4/2}$ units of 0.68, having a molecular weight of about 3,500 and a silanol content of 0.11 mol/100 g (1.87 wt %), and dissolved in Isopar E to a solid content of 60 wt % as component (A), 10 parts by weight (to give a molar ratio of component (B) to silanol groups in component (A) of 0.74) of (ethoxymethyl)triethoxysilane as component (B), 35 parts by weight of dimethylpolysiloxane capped at both ends of the molecular chain with hydroxydimethylsilyl groups and having a viscosity of 5,000 mPa·s at 23 °C and a degree of polymerization of about 389 as component (C), and 1 parts by weight of oligomer Tyzor BTP of tetra-n-butoxytitanium (manufactured by Dorf Ketal) as a component (D), and 1 parts by weight of γ-aminopropyltriethoxysilane at room temperature (23 °C) for 30 minutes.

Comparative Example 1

Composition 5 was obtained by mixing 92 parts by weight of a three-dimensional network methylpolysiloxane resin consisting of $Me_3SiO_{1/2}$ units and $SiO_{4/2}$ units in a molar ratio of $Me_3SiO_{1/2}$ units to $SiO_{4/2}$ units of 0.68, having a molecular weight of about 3,500 and a silanol content of 0.11 mol/100 g (1.87 wt %), and dissolved in Isopar E to a solid content of 60 wt % as component (A), 10 parts by weight (to give a molar ratio of component (B) to silanol groups in component (A) of 0.79) of tetraethoxysilane as component (B), 35 parts by weight of dimethylpolysiloxane capped at both ends of the molecular chain with hydroxydimethylsilyl groups and having a viscosity of 5,000 mPa·s at 23 °C and a degree of polymerization of about 389 as component (C), and 1 parts by weight of tetra-n-butyltitanate (simple substance), and 1.6 parts by weight of γ-aminopropyltriethoxysilane at room temperature (23 °C) for 30 minutes.

Comparative Example 2

Composition 6 was obtained by mixing 92 parts by weight of a three-dimensional network methylpolysiloxane resin consisting of $Me_3SiO_{1/2}$ units and $SiO_{4/2}$ units in a molar ratio of $Me_3SiO_{1/2}$ units to $SiO_{4/2}$ units of 0.68, having a molecular weight of about 3,500 and a silanol content of 0.11 mol/100 g (1.87 wt %), and dissolved in Isopar E to a solid content of 60 wt % as component (A), 10 parts by weight (to give a molar ratio of component (B) to silanol groups in component (A) of 0.79) of tetraethoxysilane as component (B), 35 parts by weight of dimethylpolysiloxane capped at both ends of the molecular chain with hydroxydimethylsilyl groups and having a viscosity of 5,000 mPa·s at 23 °C and a degree of polymerization of about 389 as component (C), and 1 parts by weight of tetra-n-octyltitanate (simple substance), and 1.6 parts by weight of γ-aminopropyltriethoxysilane at room temperature (23 °C) for 30 minutes.

Comparative Example 3

Composition 7 was obtained by mixing 92 parts by weight of a three-dimensional network methylpolysiloxane resin consisting of $Me_3SiO_{1/2}$ units and $SiO_{4/2}$ units in a molar ratio of $Me_3SiO_{1/2}$ units to $SiO_{4/2}$ units of 0.68, having a molecular weight of about 3,500 and a silanol content of 0.11 mol/100 g (1.87 wt %), and dissolved in Isopar E to a solid content of 60 wt % as component (A), 10 parts by weight (to give a molar ratio of component (B) to silanol groups in component (A) of 0.79) of tetraethoxysilane as component (B), 35 parts by weight of dimethylpolysiloxane capped at both ends of the molecular chain with hydroxydimethylsilyl groups and having a viscosity of 5,000 mPa·s at 23 °C and a degree of polymerization of about 389 as component (C), and 1.6 parts by weight of γ-aminopropyltriethoxysilane at room temperature (23 °C) for 30 minutes.

Comparative Example 4

Composition 8 was obtained by mixing 92 parts by weight of a three-dimensional network methylpolysiloxane resin consisting of $Me_3SiO_{1/2}$ units and $SiO_{4/2}$ units in a molar ratio of $Me_3SiO_{1/2}$ units to $SiO_{4/2}$ units of 0.68, having a molecular weight of about 3,500 and a silanol content of 0.11 mol/100 g (1.87 wt %), and dissolved in Isopar E to a solid content of 60 wt % as component (A), 8 parts by weight (to give a molar ratio of component (B) to silanol groups in component (A) of 0.74) of (ethoxymethyl)triethoxysilane as component (B), 30 parts by weight of dimethylpolysiloxane capped at both ends of the molecular chain with hydroxydimethylsilyl groups and having a viscosity of 5,000 mPa·s at 23 °C and a degree of polymerization of about 389 as component (C), 0.8 parts by weight of γ-aminopropyltriethoxysilane, and 0.1 parts by weight of γ-(N,N'-dimethylguanidyl)propyltrimethoxysilane at room temperature (23 °C) for 30 minutes.

The following properties were confirmed using the prepared Composition 1 to 8.

Appearance, viscosity and initial cure

The appearance of the prepared Composition 1 to 8 was visually confirmed, and the viscosity under an environment of 23 °C/50% RH was measured. In addition, the prepared Composition 1 to 8 was left to stand for 7 days under an environment of 23 °C/50% RH so as to have a thickness of 3 mm and cured, and the hardness (Duro A hardness) was measured with Durometer Type A specified in JIS K 6249.

Heat resistance

The prepared Composition 1 to 8 was left to stand on an aluminum plate of 50 mm×50 mm×5 mm in thickness under an environment of 23 °C/50% RH for 7 days so as to have a thickness of 5 mm, and cured. Subsequently, a test specimen of the cured Composition 1 to 8 was left to stand in an oven at 250 °C for 5 minutes, and whether or not bubbles were generated in the cured rubber was confirmed. The determination is as follows.

(Criterion)

○: No air bubbles were observed in the test specimen (good heat resistance).

x: Air bubbles were generated in the test specimen (poor heat resistance).

Light transmittance

The prepared Composition 1 to 8 was left to stand at 23 °C/50% RH for 7 days so as to have a thickness of 1 mm and cured, and then the light transmittance (%) of the cured product in the thickness direction at wavelengths of 450 nm, 600 nm, and 800 nm was measured with a spectrophotometer U-3310 manufactured by Hitachi High-Tech Science Corporation.

Long-term storage stability

The prepared Composition 1 to 8 was placed in a sealable transparent bottle and left to stand in a sealed state for 4 months under an environment of 23 °C/50% RH, and a color change of the composition was confirmed.

The above results are shown in the following table.

TABLE 1

| | | Example 1 Composition 1 | Example 2 Composition 2 | Example 3 Composition 3 | Example 4 Composition 4 |
|---|---|---|---|---|---|
| Appearance | | Colorless and transparent | Colorless and transparent | Colorless and transparent | Colorless and transparent |
| Viscosity (mPa · s) | | 356 | 312 | 60 | 375 |
| Duro A hardness | | 71 | 69 | 53 | 80 |
| Heat resistance | | ○ | ○ | ○ | ○ |
| Light transmittance (%) | Wavelength 450 nm | 72 | 74 | 73 | 76 |
| | Wavelength 600 nm | 77 | 78 | 75 | 80 |
| | Wavelength 800 nm | 82 | 83 | 81 | 86 |
| Long-term storage stability | | No color change | No color change | No color change | No color change |

TABLE 2

| | | Comparative Example 1 Composition 5 | Comparative Example 2 Composition 6 | Comparative Example 3 Composition 7 | Comparative Example 4 Composition 8 |
|---|---|---|---|---|---|
| Appearance | | Colorless and transparent | Colorless and transparent | Colorless and transparent | Colorless and transparent |
| Viscosity (mPa · s) | | 342 | 584 | 48 | 546 |
| Duro A hardness | | 70 | 70 | Uncured | 82 |
| Heat resistance | | ○ | ○ | Unmeasurable | x |
| Light transmittance (%) | Wavelength 450 nm | 71 | 74 | Unmeasurable | 77 |
| | Wavelength 600 nm | 75 | 76 | | 79 |
| | Wavelength 800 nm | 83 | 85 | | 87 |
| Long-term storage stability | | Yellowing | Yellowing | No color change | No color change |

As a result, in Example 1 to 4 (Composition 1 to 4), a good cured product having a Duro A hardness of 50 or more was obtained, heat resistance was also good, light transmittance at wavelengths of 450 nm, 600 nm and 800 nm were all 70% or more, and color change was not observed even in long-term storage, and the cured product was stable.

On the other hand, in Comparative Examples 1 and 2 (Compositions 5, 6), good cured products were obtained and heat resistance was also good, but yellowing was confirmed during long-term storage. In Comparative Example 3 (Composition 7), a cured product was not obtained even after being left to stand in an environment of 23 °C/50% RH, and measurement of hardness, heat resistance, and light transmittance was impossible. In Comparative Example 4 (Composition 8), by blending (ethoxymethyl) triethoxysilane excellent in rapid curability as the component (B), a cured product can be obtained without blending the component (D) or by blending a basic condensation catalyst instead of the component (D), but in the evaluation of the heat resistance, a large number of bubbles were generated in the cured product, and therefore the heat resistance was poor.

The invention claimed is:

1. A room-temperature-vulcanizing silicone coating composition comprising components (A) to (D):

(A) 100 parts by weight of an organopolysiloxane resin of three-dimensional network structure comprising $R_3SiO_{1/2}$ units and $SiO_{4/2}$ units wherein R is independently an unsubstituted or substituted $C_1$-$C_6$ monovalent hydrocarbon group or hydroxy group, in a molar ratio of $R_3SiO_{1/2}$ units to $SiO_{4/2}$ units of from 0.5 to 1.5, optionally comprising $R_2SiO_{2/2}$ units and $RSiO_{3/2}$ units wherein R is as defined above in an each molar ratio of $R_2SiO_{2/2}$ units to $SiO_{4/2}$ units and $RSiO_{3/2}$ units to $SiO_{4/2}$ units independently of from 0 to 1, the resin containing 0.11 to 0.15 mol/100 g of silicon-bonded hydroxy groups or silanol groups, and having a molecular weight of 2,000 to 10,000, (B) a hydrolyzable (organo)silane compound having three or more hydrolyzable groups in one molecule and/or partial hydrolytic condensate thereof in such an amount as to give a molar ratio of component (B) to silanol groups in component (A) of from 0.2 to 2, (C) 10 to 100 parts by weight of a linear diorganopolysiloxane which is capped at both ends of the molecular chain with a silanol group, and (D) 0.1 to 5 parts by weight of a moisture curing initiator composed of an oligomer of an organotitanium compound, wherein component D is oligomers of tetra-n-propoxytitanium, oligomers of tetraisopropoxytitanium, oligomers of tetra-n-butoxytitanium, oligomers of tetraisobutoxytitanium, oligomers of tetra-sec-butoxytitanium, oligomers of tetrakis(2-ethylhexoxy)titanium, oligomers of titanium isopropoxyoctylene glycol, oligomers of diisopropoxybis(acetylacetonate) titanium or oligomers of diisopropoxybis (ethylacetoacetonate)titanium, and wherein the composition gives a cured product having a hardness of 50 or more as measured by Durometer Type A specified in JIS K 6249.

2. The room-temperature-vulcanizing silicone coating composition according to claim 1, wherein the component (D) is an oligomer of a titanate ester compound and/or an oligomer of a titanium chelate compound.

3. The room-temperature-vulcanizing silicone coating composition according to claim 1, wherein the composition gives a cured product that does not generate an air bubble after being left to stand in an environment at 250 °C for 5 minutes.

4. The room-temperature-vulcanizing silicone coating composition according to claim 1, wherein the composition gives a cured product having a light transmittance of 70% or more at a wavelength region of 450 to 800 nm, as measured in the cured product of 1 mm thick.

5. The room-temperature-vulcanizing silicone coating composition according to claim 1, which is used for coating electrical or electronic parts and/or substrates thereof.

6. An article which is coated with a cured product of the room-temperature-vulcanizing silicone coating composition according to claim 1.

* * * * *